United States Patent
Ghosh et al.

(12)

(10) Patent No.: US 6,929,809 B2
(45) Date of Patent: Aug. 16, 2005

(54) PREPARATION OF NUTRIENT RICH SALT OF PLANT ORIGIN

(75) Inventors: Pushpito Kumar Ghosh, Gujarat (IN); Muppala Parandhami Reddy, Gujarat (IN); Jayant Batukrai Pandya, Gujarat (IN); Jinalal Shambhubhai Patolia, Gujarat (IN); Shambhubhai Mohanbhai Vaghela, Gujarat (IN); Maheshkumar Ramaniklal Ghandhi, Gujarat (IN); Rahul Jaswantrai Sanghvi, Gujarat (IN); Vaddiparty Gangadhara Sravan Kumar, Gujarat (IN); Mukesh Tribhovanbhai Shah, Gujarat (IN)

(73) Assignee: Council of Scientific and Industrial Research, New Delhi (IN)

( * ) Notice: Subject to any disclaimer, the term of this patent is extended or adjusted under 35 U.S.C. 154(b) by 503 days.

(21) Appl. No.: 10/106,334

(22) Filed: Mar. 26, 2002

(65) Prior Publication Data

US 2003/0185954 A1 Oct. 2, 2003

(51) Int. Cl.7 .............................................. A61K 35/78
(52) U.S. Cl. ................................... 424/725; 424/725.1
(58) Field of Search ............................... 424/725, 725.1

Primary Examiner—Susan Coe
Assistant Examiner—S. B. McCormick-Ewoldt
(74) Attorney, Agent, or Firm—Drinker Biddle & Reath LLP

(57) ABSTRACT

The invention describes the preparation of nutrient-rich salt from high salt-accumulating and edible oil-bearing salt tolerant plants in a way that allows simultaneous recovery of both salt and oil, the plants are routinely irrigated with seawater and occasionally with seawater enriched with salt bitterns and/or other types of wastes/by-products containing essential nutrients to raise the level of such nutrients in the plant.

17 Claims, No Drawings

PREPARATION OF NUTRIENT RICH SALT OF PLANT ORIGIN

FIELD OF THE INVENTION

The present invention relates to preparation of salt of plant origin. Specifically, the invention relates to preparation of nutritious salt formulations from edible salt tolerant oil-bearing plants in a manner that allows maximum utilization of the plant.

BACKGROUND AND PRIOR ART REFERENCES

Salt is used as a food supplement to enhance the taste of food. Salt is one of the few commodities that are being universally consumed by almost all sections of communities irrespective of socioeconomic status. It is consumed approximately at a level of 5–15 grams/day/person throughout the year. Hence salt is an attractive vehicle to introduce any nutrient supplement (M. G. Venkatesh Mannar, S. Jaipal and C. S. Pandya, *Proceedings of Sixth. International Congress*, Seoul, 1989). For example, salt is iodized for the control of goiter and it is fortified with iron for control of anemia. Salt is also a good vehicle for supply of other nutrients such as potassium, magnesium and calcium.

Reference may be made to Shuqing Wang in patent no. CN 1271541 A, 1 Nov. 2000, entitled "Multi-element low sodium nutritive salt", who disclosed the preparation of low sodium nutritive salt by crystallising salt from saturated brine under vacuum. The salt is then mixed uniformly with salts such as KCl and $MgSO_4.7H_2O$, followed by mixing with $KIO_3$ and $Na_2SeO_3$ solutions, drying and finally mixing with active Ca and Zn lactate. The drawback of this process is that apart from the difficulty of mixing various constituents in a homogeneous solid mixture, salt is to be crystallised from hot saturated brine involving high energy consumption thereby increasing the cost of production. Moreover, such a salt is not natural in its constitution.

Reference may be made to "The Heinz Handbook of Nutrition" by Benjamin T. Burton, published for H. J. Heinz Co., by McGraw Hill Book Co. Second Edition, 1965, page 132–133, which describes the dietary need for potassium.

Reference may be made to R. N. Vohra et al. in pending PCT Patent Application No.PCT/IN02/00018, dated 31 Jan. 2002 entitled "A Process for Recovery of Low sodium Salt from Bittern", who disclosed the preparation of a mixture of sodium chloride and potassium chloride containing other nutrients such as magnesium and calcium by a natural process from sea/sub-soil bittern. The main drawback of the process is that the salt does not contain any micronutrients.

Reference may be made to Rock Salt, e.g., the brand REAL SALT being sold in the U.S. market, which contains several essential micronutrients such as iron, manganese and iodine but which does not contain appreciable quantities of important essential nutrients such as potassium, calcium, magnesium and zinc. Moreover, Rock salt is available only in very limited regions of the world.

Reference may be made to Charnock, A. [(1989, December). *Plants with a taste for salt. New Scientist*, 3, pp. 41, 45] and E. P. Glenn, et al, [(1991) *Salicornia bigelovii Torr.: An oilseed halophyte for seawater irrigation. Science*, 251, 1065–67] who have described cultivation of salt tolerant plants as a potential economic activity utilizing saline wasteland and seawater irrigation. Although it is described in the publications that halophytes such as *Salicornia* are especially suitable for production of nutritious edible oil with high level of polyunsaturates, deoiled poultry feed, and fodder that is suitable for cattle either as a mixed feed or which can be used alone after desalinating the fodder by washing, no mention is made with regards to recovery of salt from the plant.

Reference may be made to M. P. Reddy, et al, *Biol. Plant.* 1993, 35, 547–553, who reported that halophytes possess the ability to concentrate salts of sodium, potassium, calcium, magnesium and to some extent micronutrients equaling or exceeding those of sea water in their leaves and stem when grown in saline conditions without adverse effects on growth and biomass production. However no attempt was made to produce salt. No attempt was also made to bias the composition of salts in the plant.

G. Naidoo and R. Rughunanan in *J. Exp. Bot.*, 1990, 41, 497–502, have studied the salt tolerance of *Sarcocornia natalensis* by irrigating the plants with different concentrations (50 to 300 moles/m$^3$) of NaCl and examining the differences in ion content of the plants. No attempt was made to produce salt.

T. J. Flowers and Y. Yeo in *Aust. J. Plant Physiol.* 1986, 13, 75–81, have stated that the dicotyledonous halophytes accumulate sodium and chloride ions to an extent of 30–50% by dry weight to maintain osmotic potential at higher salinity level. No attempt was made to produce salt.

Though it was known (T. F. Neals and P. J. Sharkey, *Aust. J. Plant Physiol*, 1981, 8, 165–179, S. Cherian et al, *Indian J. Plant Physiol*, 1999, 4, 266–270, S. Cherian and M. P. Reddy, *Indian J. Plant Physiol*, 2000, 5, 32–37 etc.) that certain halophytes accumulate reasonable amount of sodium, potassium, calcium and magnesium, the main focus of the work was to undertake mechanistic studies and none of the above attempted to produce nutrient rich salt from such plants.

OBJECTS OF THE INVENTION

The main object of the present invention is to provide a process for the preparation of salt from salt tolerant plants that accumulate high quantity of salt.

Another object of the present invention is to prepare a nutritious edible salt containing other essential minerals such as potassium, calcium, magnesium, copper, iron, manganese and zinc.

Yet another objective of the present invention is to enrich the plants with iodine by utilizing iodide-containing solid or liquid waste as co-irrigant or by using iodine-rich seaweeds as manure.

Another object is to promote such cultivation of salt tolerant plants in solar salt works where sea water and the waste bittern obtained as by-product of salt manufacture are used in combination for irrigation of the plants to enhance, in particular, the potassium content of the salt.

Yet, another object of the invention relates to recovery of both oil and salt from salt-tolerant oil-bearing plants.

SUMMARY OF THE INVENTION

The present invention relates to development of a process for the preparation of nutrient-rich salt of plant origin, specifically salt tolerant oil-bearing plants that can be cultivated with sea water/salt bitterns and have a propensity to accumulate salt within their tissues. The invention allows nutrient-rich salt to be obtained naturally instead of through artificial mixing of nutrients as resorted to in the prior art. An additional aspect of the invention is that potassium-rich waste bittern of solar salt works can be utilised as nutrient supplement during irrigation to enhance the potassium content of the salt, besides increasing the proportions of other essential minerals like magnesium, copper, iron, iodine, manganese, and zinc. Another aspect is the utilization of by-product or waste iodide containing solids or liquids as co-irrigant to enhance iodine content in the plant. A further aspect of the invention is that the process of recovery of salt does not interfere with the recovery of oil from the plant.

It has been found that the halophytic plant species take up different metal salts by absorption when irrigated with sea or saline water and accumulate about 30–55% inorganic salts by dry weight in leaves and stem and the composition of salts can be adjusted utilizing waste bittern of salt industry as a co-irrigant. The salt can be obtained in crude or refined form and contains mainly sodium chloride besides essential minerals.

DETAILED DESCRIPTION OF THE INVENTION

Accordingly, the present invention provides a process for the preparation of nutrient rich herbal salt from edible halophytic plant species which are salt tolerant and oil bearing plants, said process comprising steps of:

(a) growing salt tolerant edible halophytic plants on saline soils by irrigating with a mixture of seawater and waste bitterns;

(b) co-irrigating plant of step (a) with a source material containing desired amount of iodidine;

(c) harvesting, washing and drying the plant of step (b) to obtain biomass;

(d) separating seed from spikes or husk of biomass of step (c) to obtain remaining biomass;

(e) mixing husk with the remaining biomass of step (d), (f) charring the mixture of husk and biomass of step (e) in an open container;

(g) incinerating the charred mass of step (f) in a furnace at a temperature ranging between 300 and 600° C. to obtain crude herbal salt; and (h) dissolving the crude herbal salt of step (g) in water, filtering and evaporating the solution to obtain fine white crystalline and free flowing refined herbal salt.

In an embodiment of the invention, the crude herbal salt is alternatively obtained by treating the dry biomass devoid of seeds with hot water, decanting and solar evaporating the leachate to recover salt rich in both inorganic and organic nutrients.

Another embodiment the salt tolerant plant oil bearing edible halophytic plants in step (a) are selected from *Salicornia brachiata* and *Suaeda nudiflora*.

Still another embodiment, the irrigation of plants in step (a) are carried out by using a mixture of waste salt bitterns rich in potassium and magnesium having density in the range of 29° Be'–37° Be' is added into sea water as an irrigant in the ratio ranging between 0:1 and 1:1.

Still another embodiment of the invention, the plants are irrigated 1 to 10 times in addition to routine sea water irrigation over the cultivation period of 3–8 months to enrich the salt with potassium and other nutrients.

Yet another embodiment, other sources of potash fertilizer such as muriate of potash can be used in place of bittern for similar purpose.

Yet another embodiment of the invention, the salt tolerant plants in step (a) are preferably selected from the group of plants that can be cultivated on saline soils with soil conductivity in the range 15–140 $dSm^{-1}$ and irrigated with saline water including sea water of 2.5–4.0° Be' and salt bitterns of 29–37° Be'.

Yet another embodiment of the invention, the said salt tolerant plants accumulate up to 30–50% salt in their tissues.

Yet another embodiment of the invention, iodine source material used in step (b) is selected from a group consisting of iodide containing liquid or solid waste, iodine rich sea-weeds and iodine rich manure.

Yet another embodiment of the invention, the crude herbal salt obtained in step (g) is naturally free flowing.

Yet another embodiment of the invention, the refined herbal salt obtained in step (h) is naturally free flowing.

Yet another embodiment of the invention, the incineration in step (f) is carried out for 1 to 6 hours at a temperature ranging between 300 and 600° C.

One more another embodiment of the invention, the crude salt obtained in step (g) can be refined by reducing insoluble materials by using a washery used in conventional methods.

Yet another embodiment of the invention, the crude salt of step (g) contains 55%–75% sodium chloride, 3%–30% potassium chloride, 0.1–8.0% calcium, 0.2–7.0% magnesium, 10–150 ppm zinc, 100–1000 ppm iron, 5–50 ppm copper and 50–200 ppm manganese.

Yet another embodiment of the invention, the fine white crystalline and free flowing salt of step (h) containing 70–90% sodium chloride, 5–30% potassium chloride, 50–1000 ppm iron, and other essential nutrients.

Yet another embodiment of the invention, the oil-containing seeds are removed from spikes by manually or mechanically so as to obtain biomass to produce herbal salts and essential oil simultaneously and thereby make cultivation of such plants more remunerative.

The present invention provides a process for the preparation of nutrient rich salt from salt-tolerant oil-yielding plants by growing such plants on 15–140 $dSm^{-1}$ saline soils, irrigating with 2.5–4.0° Be' seawater and 29° Be'–37° Be' bittern in the ratio of 1:0 to 1:1; harvesting; co-irrigating with seawater and desired amount of iodide containing solid or liquid waste; alternatively, using iodine-rich seaweeds or other iodine-rich bio-sources as manure; washing with sea water; sun drying; separating seed from spikes, mixing the husk with the remaining biomass, charring in an open container; incinerating in a furnace at 300–600° C. to give crude, sterilized herbal salt containing 55%–75% sodium chloride, 3%–30% potassium chloride, 0.1–8.0% calcium, 0.2–7.0% magnesium, 10–150 ppm zinc, 100–1000 ppm iron, 5–50 ppm copper, 50–200 ppm manganese; dissolving the crude herbal salt in water; filtering and evaporating to give fine white crystalline and free flowing salt containing 70–90% sodium chloride, 5–30% potassium chloride, 50–1000 ppm iron, and other essential micronutrients.

In an embodiment of the present invention, the edible halophytes, *Salicornia brachiata* and *Suaeda nudiflora*, were selected for the preparation of nutrient rich edible salt.

In another embodiment of the present invention, the soil having salinity ranging from 15–140 $dSm^{-1}$ was used for growing the plants.

In another embodiment of the present invention, the seawater having density in the range of 2.5–4.0° Be' was used for growing the plants.

In another embodiment of the present invention, the pH of the seawater used for irrigating the plants was in the range of 7.3–8.5.

In another embodiment of the present invention, waste salt bitterns rich in K and Mg having density in the range of 29° Be'–37° Be' was added into sea water as a co-irrigant up to a maximum extent of 50% of total volume.

In another embodiment of the present invention, iodide-containing salts were added into seawater as co-irrigant up to a maximum extent of 50-mM concentration of iodide to raise the iodine content of the plant.

In another embodiment of the present invention, the plant biomass was sun dried for a period of 4–7 days and the seeds were then removed manually from the spikes.

In another embodiment of the present invention, the total dry biomass after removal of seeds was ignited and charred in open container.

In another embodiment of the present invention, charred biomass was incinerated for 3–10 hours in a furnace at 300–600° C. to remove all organic matter and to sterilize the product.

In another embodiment of the present invention the crude salt was subjected to refinement in a conventional salt washery to purify the salt.

In another embodiment of the present invention, the crude salt was dissolved in water, the solution then filtered and evaporated to dryness to obtain white crystalline free flowing salt wherein all nutrients are retained.

In another embodiment of the present invention, the dry biomass is treated with hot water, the solution decanted and solar evaporated to recover salt.

Edible salt is normally prepared from seawater. Its production is based on solar evaporation. The other important sources are inland lakes, saline wells, rock salt (bedded deposits) and salt domes or diapers as solid salt. Although there has been a trend towards refined edible salt that is fortified with iodine for the prevention of goiter, and occasionally with iron for prevention of anemia, other important nutrients are virtually absent. Crude salt compositions such as rock salt are popular because of the presence of many essential nutrients essential for the body, e.g., Fe, I, Mn, Cu, Zn. However, the proportions of some of the nutrients is small, e.g., 0.05–0.6% of K and 1–5 ppm Zn. It has been found in the course of this invention that substantially higher amounts of such essential minerals accumulate in tissues of salt tolerant plants in addition to NaCl. Moreover, plants such as *Salicornia* and *Sueda* are edible and even available in markets as fresh vegetable in several countries. On the other hand, when the plants are dried, oil can be recovered from the seeds but the remaining dry biomass is normally unutilized. It occurred to the inventors that this biomass, which has accumulated salt and minerals, could be converted into nutrient-rich edible salts of different formulations. It further occurred to the inventors that, if such plants can be cultivated in the vicinity of solar salt works, the waste bitterns of the salt industry can be utilized as irrigant in combination with sea water to enhance the nutrient value of the salt since the bitterns are substantially more concentrated in potassium, magnesium, and micronutrients than the sea water alone, and the plants have sufficient tolerance to salinity to allow for the use of bittern. It further occurred that iodide-containing solid or liquid waste or iodine-containing bioresources such as certain seaweeds could be utilized to raise the iodine content of the plants.

Halophytes are those which can thrive on sea water/saline soils and produce biomass. Such plants are, therefore, ideally suited for saline wasteland cultivation. The incentive for such cultivation would be high if a better remuneration can be realized from the produce. *Salicornia*, for example, yields an edible oil that is highly rich in polyunsaturates but the low yield of oil (typically 200–500 kg from 1000–2500 kg of seed/hectare) may not make cultivation sufficiently attractive. To increase the attractiveness, it would be essential to realize a second product from the produce that is also potentially marketable. Since 10–20 tons of dry biomass of *Salicornia* can be produced per hectare of cultivation, and since 40–50% of this biomass comprises salt, it is possible to obtain 4–10 tons of nutrient rich salt from the biomass. Being nutrient-rich, the salt should be sufficiently more valuable than ordinary solar salt and could be an attractive additional source of income in addition to the income from the oil.

*Salicornia brachiata*, an annual erect branched herb, belonging to the family chenopodiaceae was selected to illustrate the invention in view of the high accumulation (45% of dry weight) of salt, the known edible nature of the plant, the tolerance of the plant to sea water irrigation and even to bittern, and the high biomass (10–20 tons dry weight per hectare) obtained in planned cultivation with elite germplasm.

Spikes obtained from elite germplasm of *Salicornia brachiata* were sown in about one acre saline soil in a coastal area inundated by seawater during high tides. Initially, the land was irrigated for one week with fresh water for easy germination, initial establishment and later with seawater for a period of six to eight months. The fully-grown plants were then harvested by uprooting, the roots were removed, the plants were washed thoroughly with seawater, and sun dried. The dried biomass could be spontaneously burnt and thereafter it was subjected to further incineration in a muffle furnace at 425° C. The crude salt obtained was then dissolved in minimum quantity of water and filtered to remove insolubles. The solution was then subjected to forced or solar evaporation to recover the salt and nutrients completely.

Sodium and potassium were estimated by using Flame photometer, calcium and magnesium by the versinate method (Vogel, *A text book of quantitative inorganic analysis*, 1978, The ELBS edition, London, and chloride by titrating against silver nitrate (Volhard, *Modern method of plant analysis*, 1956, edited by K. Peach and M. V. Tracey, Vol-1, 487, Springer verlag, Berlin, Edinburgh). The salts were analyzed for copper, iron, manganese and zinc using x-ray fluorescence (XRF) spectroscopy by preparing solid pellets with the help of a binder. A similar procedure was followed to estimate micronutrients in the purified salt.

The important innovative steps involved in the present invention are: (i) realization that salt can be recovered from salt tolerant plants in desired form, (ii) ensuring that the method of recovery is such that both oil and salt can be recovered from the dried biomass, (iii) growing the plants in the vicinity of solar salt works and using waste bitterns of the salt works as co-irrigant together with sea water to enhance the content of KCl in the salt to levels as high as 20% and simultaneously providing other essential nutrients in significant quantities, (iv) supplementing the seawater with iodide-containing salts to raise the iodine content of the plant.

The following examples are given by way of illustration and should not be construed to limit the scope of the present invention.

EXAMPLE 1

*Salicornia brachiata* plant was washed thoroughly with seawater to remove adhering particles of dirt. The plant, which weighed 37.2 Kg, was sun dried till a constant weight of 6.01 Kg. was obtained. The dried mass was charred in an open container by igniting with a match stick and thereafter incinerated at 425° C. for 3 h to obtain 2.84 kg of crude salt which was grayish-brown in colour. The crude salt contained ca. 70% NaCl, 6% KCl, 1.05% calcium, 1.32% magnesium, 2.53% sulphate and 9% insolubles.

EXAMPLE 2

376 g of the crude salt of Example 1 was dissolved in 2 liters of distilled water and filtered. The filtrate was evaporated to dryness to yield 355 g of refined and free flowing salt which was white in colour and contained ca. 85% NaCl, 5.5% KCl, 1.53% calcium, 1.69% magnesium and 3.01% sulphate.

EXAMPLE 3

*Salicornia brachiata* grown in pots was irrigated with sea water for 3 months, and processed as per the procedure of EXAMPLE 1 to give crude salt with 61% NaCl and 5.4% KCl.

EXAMPLE 4

*Salicornia brachiata* grown in pots was irrigated with seawater for 3 months and during the period three irrigations were given with a mixture of 31° Be' bittern and seawater in the ratio of 1:3. The plants were processed as per the procedure of EXAMPLE 1 to give crude salt containing 58.6% NaCl and 12.7% KCl. The salt was also analyzed by XRF for micronutrients and contained 576 ppm Fe, 88 ppm Mn, 73 ppm Zn and 17 ppm Cu. The crude salt was refined as per the procedure of EXAMPLE 2 and the salt contained 81% NaCl, 11% KCl and 66 ppm Fe.

EXAMPLE 5

*Salicornia brachiata* was cultivated in the field using seawater as irrigant. A single plant with dry weight of 427 g was harvested at maturity and seeds weighing 52 g were separated from the spikes. 15.76 g oil was recovered from the seeds through extraction with hexane. The remaining dry biomass weighing 361 g was processed as per the experimental procedure of EXAMPLES 1 and 2 to give 146 g of refined salt.

EXAMPLE 6

Dry biomass of *Salicornia brachiata* was obtained as described in the procedure of Example 1. The dry biomass was directly extracted with hot (60–70° C.) water and chocolate colored salt with a "Bourne Vitae" type aroma was recovered from the aqueous solution upon evaporation of the extract. In addition to NaCl, KCl and other inorganic nutrients, the salt contained 0.2% free amino acids as also proteins, carbohydrates, lipids and pigments in reasonable quantities.

EXAMPLE 7

*Suaeda nudiflora* plant growing wildly was collected and processed as per the example of EXAMPLE 1 to give 1.43 kg of fresh biomass from which 0.28 kg of dry biomass was obtained. 0.13 kg of crude salt was obtained from the dry biomass as per the procedure of EXAMPLE 1. The crude salt contained 70% NaCl and 6% KCl.

EXAMPLE 8

*Suaeda nudiflora* grown in pots was irrigated and processed as per the procedure of EXAMPLE 4 and 250 g of fresh biomass was obtained which was sun dried to a constant dry weight (48.5 g). The dry biomass was treated as per the procedure of EXAMPLE 1 to yield 20 g of crude salt containing: 55% NaCl and 18% KCl. The salt was also analysed by XRF for micronutrients and contained 570 ppm Fe, 188 ppm Mn, 128 ppm Zn and 13 ppm Cu. A further 20 g of crude salt was processed as per the procedure of EXAMPLE 2 to yield 18.2 g of refined salt containing 75% NaCl and 17% KCl.

EXAMPLE 9

*Salicornia brachiata* grown in pots was irrigated with 0.6 M sodium chloride supplemented with quarter strength of Hogland's nutrient solution. A final irrigation was given with the same solution but enriched with 20 mM potassium iodide a week before harvesting. The plants remained healthy and continued to grow, and their enrichment with iodine was confirmed through EDAX analysis of scanning electron micrographs of the plant tissues. The composition of the major ions in the plant as estimated by the EDAX analysis was: 24.38% sodium, 5.37% potassium, 49.6% chloride and 8.6% iodide.

EXAMPLE 10

150 g of crude salt was prepared from *Salicornia brachiata* as per the procedure of EXAMPLE 1. The salt was subjected to mechanical washing with saturated brine and the insolubles in the salt could be reduced from 12% to 8.3%.

The Main Advantages of this Invention are:
1. Unlike common salt, the nutrient rich salt of plant origin is highly nutritious, being rich in potassium chloride and several essential micronutrients such as iron, manganese, copper, zinc and amino acids.
2. Up to 4–10 tons of nutrient rich salt can be obtained per hectare of cultivation and since large tracts of saline wasteland are available in the vicinity of solar salt works and other coastal areas, it may be possible to produce large quantities of such nutrient-rich salt.
3. Production of such nutrient rich salt from salt tolerant oil-bearing plants would make their cultivation more remunerative since both edible oil and salt can be recovered.
4. The salt tolerant characteristics of the plants selected in the present invention make the plants amenable to irrigation with not only plain sea water but with bittern-supplemented sea water that greatly improves the potassium content of the salt besides increasing the levels of other micronutrients as well.
5. The salt would be appealing to strict vegetarians since it is derived from a vegetable source.
6. The crude and refined salts are naturally free flowing and do not require addition of additives such as silica and magnesium carbonate for this purpose.
7. The plants can be enriched in iodine by irrigation with seawater enriched with iodide salt preferably in waste sources or by adding iodine-rich manure such as Padina and Sargassum seaweeds to the soil.

What is claimed is:

1. A process for the preparation of nutrient containing herbal salt from halophytic plant selected from the group consisting of *Salicornia* spp. and *Suaeda* spp., wherein said plant is edible, salt accumulating, salt tolerant, and oil bearing, said process comprising the steps of:
   a. growing the halophytic plant on saline soils with irrigation with a mixture of seawater and waste bitterns;
   b. co-irrigating the plant of step (a) with a source material containing iodine;
   c. harvesting, washing and solar drying the plant of step (b) to obtain a dry biomass, and removing spike or husk from the dry biomass to obtain a remaining biomass;
   d. separating seed from the spike or husk;

e. mixing the spike or husk of step (d) with the remaining biomass of step (c) to obtain a mixed biomass;

f. charring the mixed biomass of step (e) in an open container to obtain a charred mass;

g. incinerating the charred mass of step (f) in a furnace at a temperature ranging between 300 and 600° C. to obtain crude herbal salt; and h. dissolving the crude herbal salt of step (g) in water to obtain a solution, and filtering and evaporating the solution to obtain fine white crystalline and free flowing refined herbal salt.

2. The process as claimed in claim 1, wherein the halophytic plant is selected from the group consisting of *Salicornia brachiata* and *Suaeda nudiflora*.

3. The process as claimed in claim 1, wherein in step (a), the waste bitterns comprise potassium and magnesium and have a density in the range of 29° Be'–37° Be', and wherein the mixture of waste bitterns and sea water is in a ratio ranging between 0:1 and 1:1.

4. The process as claimed in claim 3, wherein the plant is irrigated 1 to 10 times over a period of 3–8 months with the mixture of seawater and waste bitterns.

5. The process as claimed in claim 1, wherein in step (a), the saline soils have a soil conductivity in the range of 15–140 $dSm^{-1}$, the sea water has a density in the range of 2.5–4.0° Be' and the waste bitterns have a density in the range of 29–37° Be'.

6. The process as claimed in claim 1, wherein in step (a), the halophytic plant accumulates up to 30–50% salt in its tissues.

7. The process as claimed in claim 1, wherein in step (b), the iodine source material is selected from the group consisting of iodine containing liquid or solid waste, iodine containing sea-weeds and iodine containing manure.

8. The process as claimed in claim 1, wherein the crude herbal salt obtained in step (g) is naturally free flowing.

9. The process as claimed in claim 1, wherein the refined salt obtained in step (h) is naturally free flowing.

10. The process as claimed in claim 1, wherein in step (g), the incinerating is carried out for 1 to 6 hours.

11. The process as claimed in claim 1, wherein in step (g), the crude salt contains 55%–75% sodium chloride, 3%–30% potassium chloride, 0.1–8.0% calcium, 0.2–7.0% magnesium, 10–150 ppm zinc, 100–1000 ppm iron, 5–50 ppm copper and 50–200 ppm manganese.

12. The process as claimed in claim 1, wherein in step (h), the refined salt comprises 70–90% sodium chloride, 5–30% potassium chloride, 50–1000 ppm iron.

13. The process as claimed in claim 1, wherein the seed is separated from the spike or husk manually or mechanically so as to allow simultaneous processing of the biomass and the seed, wherein the processing obtains herbal salt from the biomass and linoleic-rich oil from the seeds.

14. A process for the preparation of nutrient containing herbal salt from a halophytic plant selected from the group consisting of *Salicornia* spp. and *Suaeda* spp., wherein said plant is edible, salt accumulating, salt tolerant, and oil bearing, said process comprising the steps of:

a. growing the halophytic plant on saline soils with irrigation with a mixture of seawater and waste bitterns;

b. co-irrigating the plant of step (a) with a source material containing iodine;

c. harvesting, washing and solar drying the plant of step (b) to obtain a dry biomass, and removing spike or husk from the dry biomass to obtain a remaining biomass;

d. separation seed from the spike or husk;

e. mixing the spike or husk of step (d) with the remaining biomass of step (c) to obtain a mixed biomass;

f. treating the mixed biomass obtained in step (e) with water at a temperature of 60–70° C., decanting and solar evaporating the water to recover salt containing both organic and inorganic nutrients.

15. A process for the preparation of nutrient containing herbal salt from a halophytic plant selected from the group consisting of *Salicornia* spp. and *Suaeda* spp., wherein said plant is edible, salt accumulating, salt tolerant, and oil bearing, said process comprising the steps of:

a. growing the halophytic plant on saline soils with irrigation with a mixture of seawater and potash fertilizer;

b. co-irrigating the plant of step (a) with a source material containing iodine;

c. harvesting, washing and solar drying the plant of step (b) to obtain a dry biomass, and removing spike or husk from the dry biomass to obtain a remaining biomass;

d. Separation seed from the spike or husk;

e. mixing the spike or husk of step (d) with the remaining biomass of step (c) to obtain a mixed biomass;

f. charring the mixed biomass of step (e) in an open container to obtain a charred mass;

g. incinerating the charred mass of step (f) in a furnace at a temperature ranging between 300 and 600° C. to obtain crude herbal salt; and h. dissolving the crude herbal salt of step (g) in water to obtain a solution, filtering and evaporating the solution to obtain fine white crystalline and free flowing refined herbal salt.

16. The process as claimed in claim 15, wherein the potash fertilizer a muriate of potash.

17. A process for the preparation of nutrient containing herbal salt from a halophytic plant selected from the group consisting of *Salicornia* spp. and *Suaeda* spp., wherein said plant is edible, salt accumulating, salt tolerant, and oil bearing, said process comprising the steps of:

a. growing the halophytic plant on saline soils with irrigation with a mixture of seawater and potash fertilizer;

b. co-irrigating the plant of step (a) with a source material containing iodine;

c. harvesting, washing and solar drying the plant of step (b) to obtain a dry biomass, and removing spike or husk from the dry biomass to obtain a remaining biomass;

d. separation seed from the spike or husk;

e. mixing the spike or husk of step (d) with the remaining biomass of step (c) to obtain a mixed biomass;

f. charring the mixed biomass of step (e) in an open container to obtain a charred mass;

g. incinerating the charred mass of step (f) in a furnace at a temperature ranging between 300 and 600° C. to obtain crude herbal salt; and h. using a washery to reduce insoluble materials in the crude herbal salt of step (g) to obtain a refined herbal salt.

* * * * *